ized Patent [19] 3,802,953
Marzocchi [45] *Apr. 9, 1974

[54] GLASS FIBERS TREATED WITH ALKALINE COMPATIBLE CHROMIC COMPLEXES AND REINFORCED ELASTOMERS PRODUCED THEREFROM

[75] Inventor: Alfred Marzocchi, Cumberland, R.I.

[73] Assignee: Owens-Corning Fiberglas Corporation, Toledo, Ohio

[ * ] Notice: The portion of the term of this patent subsequent to Dec. 5, 1989, has been disclaimed.

[22] Filed: Sept. 13, 1972

[21] Appl. No.: 288,615

Related U.S. Application Data

[63] Continuation-in-part of Ser. No. 98,813, Dec. 16, 1970, Pat. No. 3,707,075.

[52] U.S. Cl............. 161/176, 57/153, 117/126 GQ, 117/126 GR, 161/198, 161/202, 161/203, 161/204, 260/438.5 R, 260/438.5 C, 260/844
[51] Int. Cl...................... C03c 25/02, B32b 17/04
[58] Field of Search........... 161/170, 176, 198, 144, 161/193, 202–204; 117/126 GR, 126 GQ, 161 A, 162, 163; 260/438.5 R, 438.5 C, 844; 57/153, 164

[56] References Cited
UNITED STATES PATENTS
| | | | |
|---|---|---|---|
| 2,544,668 | 3/1951 | Goebel et al. | 260/438.5 |
| 3,451,886 | 6/1969 | Eakins | 161/93 |
| 3,508,990 | 4/1970 | Marzocchi | 161/176 X |

Primary Examiner—George F. Lesmes
Assistant Examiner—Lorraine T. Kendell
Attorney, Agent, or Firm—Staelin Overman; Keith V. Rockey

[57] ABSTRACT

Alkaline compatible chromic complexes are prepared by contacting a resorcinolato chromic complex, a trimethylol resorcinolato chromic complex or a Werner chromic complex with an alkanol amine or alkylene polyamine. The resulting complexes are compatible with alkaline systems and can be used in the treatment of hydrophilic and hydrophobic substrates. The complexes of the present invention are particularly well suited for use in the treatment of glass fibers, preferably in admixture with an aqueous alkaline impregnating composition.

21 Claims, No Drawings

GLASS FIBERS TREATED WITH ALKALINE COMPATIBLE CHROMIC COMPLEXES AND REINFORCED ELASTOMERS PRODUCED THEREFROM

This is a continuation-in-part of copending application Ser. No. 98,813, filed Dec. 16, 1970 now U.S. Pat. No. 3,707,075.

This invention relates to improved chromium complexes, and more particularly to chromium complexes having improved compatibility with alkaline media for use in the treatment of hydrophilic and hydrophobic substrates.

Werner-type complexes with chromium are now well known to those skilled in the art, and can be used in the treatment of glass fibers as a coupling or anchoring agent to promote bonding of organic molecules, such as organic dyestuffs, rubbers and resorcinol-aldehyde-elastomer latices, to the glass fiber surfaces. In addition, such complexes are also widely used for water repellant and sizing treatment of negatively charged surfaces, as anti-blocking agents, to insolubilize various water-soluble or swellable coatings, etc.

The Werner complexes are formed of a carboxylato group coordinated with a nuclear trivalent chromium atom, and are characterized by the formula

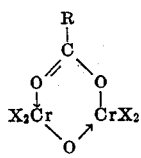

wherein $X_2$ is halogen and preferably chlorine, and R represents the residue of the carboxylato group and usually contains from two to 20 carbon atoms which may, though not necessarily, be substituted by one or more functional groups. These complexes can be prepared by known techniques in which a basic chromium solution is reacted with the corresponding carboxylic acid as described in U.S. Pat. Nos. 2,544,667 and 2,683,156.

In my copending application Ser. No. 98,813, filed Dec. 16, 1970, there are described new and different chromium complexes which are prepared by reaction of chromyl chloride with resorcinol or a trimethylol resorcinol. Without limitation as to theory, it is believed that these complexes have the formulae

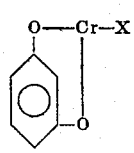

and

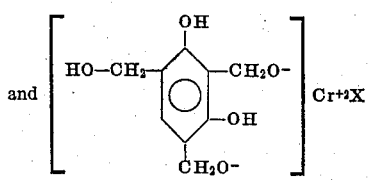

where X is halogen and preferably chlorine. The latter complexes can also be employed, for example, as coupling agents in the treatment of glass fibers.

The chromium complexes described above tend to be acidic in aqueous media and consequently are not always stable in contact with alkaline media. For example, when such complexes are incorporated into alkaline latices formulated of a resorcinol-aldehyde resin and an elastomer, there is a pronounced possibility for either the chromium complex and/or the components of the latex to kick out of the latex formulation.

It is accordingly an object of the present invention to produce and to provide a method for producing chromium complexes which are stable and compatible with alkaline systems for use in the treatment of hydrophilic and hydrophobic substitutes.

It is a related object of the invention to provide chromium complexes which are compatible with aqueous alkaline latices containing a resorcinol-aldehyde resin component and an elastomer component for use in the treatment of glass fibers for reinforcement of elastomeric materials.

The concepts of the present invention reside in improved chromium complexes having improved compatibility and stability with alkaline systems in which a chromium complex is contacted with an amine compound. The resulting product has been found to be stable in alkaline systems including alkaline latex systems formulated to include a resorcinol-aldehyde resin and an elastomer in over all concentrations of the product in such alkaline systems.

As the amine compound which is reacted with the chromium complexes to produce a complex which is stable in alkaline media, use can be made of alkanol amines containing one to six carbon atoms, such as trimethanol amine, ethanol amine, diethanol amine, triethanol amine, propanol amine, dipropanol amine, tripropanol amine, dibutanol amine, tributanol amine, etc.; or alkylene polyamines in which the alkylene group contains two to four carbon atoms, such as ethylene diamine, diethylene triamine, triethylene tetraamine, tetraethylene pentamine, propylene diamine, dipropylene triamine, butylene diamine, dibutylene triamine, etc.

The reaction can be conveniently carried out by contacting the amine compound with the chromium complex at room temperature for a period of up to about one hour, although the reaction which occurs usually takes place quite rapidly. Higher or lower temperatures may be used as desired, with temperatures within the range of 0° to the boiling point of the amine compound employed. The amount of amine compound employed is similarly not critical and can be varied within wide ranges. For best results, use should be made of from 0.50 to 4.0 moles of the amine compound per mole of complex.

The chromium complexes contemplated for use in the practice of this invention include the chromium complexes described above which are prepared by reaction of chromyl chloride with resorcinol or trimethylol resorcinol as set forth in my copending application.

Also contemplated for use in the practice of this invention are the Werner complexes which contain a carboxylato group, preferably having two to 20 carbon atoms, coordinated with a trivalent nuclear chromium atom. The carboxylato group may be unsubstituted or substituted with a variety of organic functional groups such as an amino group, an epoxy group, a mercapto group, a hydroxy group, etc.

Preferred Werner complexes are those having the formula

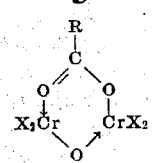

wherein X is halogen and preferably chlorine, and R is an organic group containing one to 19 carbon atoms. Representative R groups include alkyl containing one to 19 carbon atoms (e.g., methyl, ethyl, propyl, butyl, lauryl, etc.); an amino alkyl group, such as aminomethyl, aminoethyl, aminopropyl, etc.; a mercaptoalkyl group such as marcaptomethyl, mercaptoethyl, mercaptopropyl, etc.; a hydroxyalkyl group such as hydroxymethyl, hydroxyethyl, hydroxypropyl, etc.; an alkenyl group such as a vinyl group, an allyl group, etc. containing 2 to 19 carbon atoms; or an epoxy group

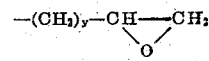

where y is an integer from 1 to 10 or higher.

Illustrative of such complexes are propylato chromic chloride, glycine chromic chloride, β-alanine chromic chloride, methacrylato chromic chloride, glycylato chromic chloride, steareato chromic chloride, gamma-hydroxypropylato chromic chloride, delta-mercaptobutylato chromic chloride, 4,5-epoxy pentylato chromic chloride.

The alkaline compatible chromium complexes preferred in accordance with the practice of the invention are susceptible to a variety of uses, including those of the unmodified complexes. The alkaline compatible complexes of the invention are particularly well suited for use in the treatment of glass fibers to promote a secure bonding relation between glass fibers and elastomeric materials in the manufacture of glass fiber-reinforced elastomeric products.

In accordance with one embodiment of the invention, the complexes prepared in the practice of the invention are applied to the individual glass fibers to form a thin film or size coating on the glass fiber surfaces. The sized glass fibers can then be used in forming textiles, or in the reinforcement of elastomeric materials in the manufacture of glass fiber reinforced elastomeric products such as tires, drive belts, V-belts, etc. In the latter application, the glass fibers which have been sized with the modified complex can be combined directly with an elastomeric material constituting the continuous phase of a reinforced elastomeric material, but it is preferred to form the sized fibers into yarns, cords, strands or fabrics, referred to in the art as bundles, and impregnate the bundles with an elastomer compatible material, preferably in the form of a blend of a resorcinol-aldehyde resin and an elastomer. The impregnated bundles can then be combined with elastomeric materials as reinforcement for the elastomeric material.

In accordance with another and frequently preferred embodiment of the invention, the modified chromium complexes prepared in accordance with the practice of the present invention are formulated with an aqueous alkaline latex system containing a resorcinol-aldehyde resin and an elastomer for use in the treatment of glass fibers to provide a secure bonding relationship between the treated glass fibers and an elastomeric material constituting the continuous phase of a reinforced product. The composition described can be applied to individual glass fibers to form a thin film coating thereon, or it can be applied to a bundle of glass fibers, in which the individual glass fibers forming the bundle preferably but not necessarily have a thin size coating on the individual surfaces thereof, to impregnate the bundle.

Glass fiber treating compositions embodying a resorcinol-aldehyde resin component and an elastomer component in the form of an aqueous latex for use with the modified chromium complexes in the practice of this embodiment of the invention are well known to those skilled in the art and are described in U.S. Pat. Nos. 3,402,064, 3,424,608, 3,567,671, 3,591,357 and numerous others.

Having described the basic concepts of the invention, reference is now made to the following examples which are provided by way of illustration and not by way of limitation, of the practice of the invention in the preparation of the alkaline compatible complexes and their use in the treatment of glass fibers.

EXAMPLE 1

The chromic complex prepared in Example 19 of my copending application Ser. No. 98,813 is mixed with triethanol amine in a mole ratio of 1:1 and the resulting mixture is allowed to stand for about 10 minutes. The reaction product is then placed in water for formulation into the following impregnating composition:

| | Parts by weight |
|---|---|
| Natural rubber latex - resorcinol formaldehyde resin (38% solids - Lotol) | 30.0 |
| Modified chromic complex | 4.0 |
| Water | 64.0 |

The composition is then used to impregnate a bundle of glass fibers which may or may not contain a thin size coating on the individual glass fibers, whereby the solids of the impregnating composition serve to penetrate the bundle to fill the interstices between the fibers and separate the fibers each from the other.

The reaction between the chromic complex and the amine can be carried out in the absence of any solvent, if desired, since both the chromic complex and the amine with which they are reacted are normally liquid. However, the reaction can also be carried out in the presence of an inert organic solvent. Solvents which can be used include alkanols containing one to eight carbon atoms (e.g., ethanol, isopropanol, butanol, etc.), lower aliphatic aldehydes and ketones (e.g., acetaldehydes, propionaldehyde, butyraldehyde, etc. and acetone, diethyl ketone, methyl ethyl ketone, etc.) as well as others.

EXAMPLE 2

The modified chromic complex prepared in Example 1 is formulated into the following impregnating composition:

| | Parts by weight |
|---|---|
| Resorcinol-formaldehyde resin (Penacolyte 2170) | 10.0 |
| Vinyl pyridine-butadiene-styrene terpolymer (Gentac FS - General Tire and Rubber Co.) | 40.0 |
| Modified chromic complex | 5.0 |

Water constitutes the balance of the composition and is present in an amount sufficient to provide a solids content within the range of 10 to 50 percent by weight. The composition is applied to glass fiber bundles in an amount to deposit solids constituting from 10 to 25 percent of the glass fiber system.

EXAMPLE 3

The chromic complex prepared in Example 1 is formulated into the following impregnating composition:

| | Parts by weight (solids) |
|---|---|
| Resorcinol-formaldehyde resin | 6.0 |
| Vinyl pyridine-butadiene-styrene terpolymer | 30.0 |
| Dicarboxylated butadiene-styrene resin (Pliolite 4121) | 20.0 |
| Microcrystalline paraffin wax | 6.0 |
| Modified chromic complex | 3.0 |
| Water to solids content of 30.0% | |

EXAMPLE 4

Using the procedure described in Example 1, methacrylato chromic chloride is reacted with diethanol amine. The modified complex is then formulated into the following impregnating composition:

| | Parts by weight (solids) |
|---|---|
| Natural rubber latex-resorcinol formaldehyde resin | 30.0 |
| Modified chromic complex | 1.0 |
| Water to solids content of 30% | |

EXAMPLE 5

The chromic complex prepared in Example 4 is formulated into the following impregnating composition:

| | Parts by weight (solids) |
|---|---|
| Resorcinol-formaldehyde resin | 6.0 |
| Butadiene-styrene rubber | 30.0 |
| Modified chromic complex | 2.0 |
| Water to solids content of 25% | |

EXAMPLE 6

The chromic complex prepared in Example 4 is formulated into the following impregnating composition:

| | Parts by weight (solids) |
|---|---|
| Resorcinol-formaldehyde resin | 6.0 |
| Vinyl pyridine-butadiene-styrene terpolymer | 25.0 |
| Vinyl chloride - vinylidene chloride copolymer (Dow latex 874) | 20.0 |
| Microcrystalline paraffin wax | 5.0 |
| Modified chromic complex | 3.0 |
| Water to solids content of 32% | |

EXAMPLE 7

Using the procedure of Example 1, aminopropylato chromic chloride is reacted with diethylene triamine. The resulting complex is then formulated into the following impregnating composition:

| | Parts by weight (solids) |
|---|---|
| Natural rubber latex - resorcinol formaldehyde resin | 35.0 |
| Modified chromic complex | 1.0 |
| Water to solids content of 35% | |

EXAMPLE 8

The modified complex prepared in Example 7 is formulated into the following impregnating composition:

| | Parts by weight (solids) |
|---|---|
| Resorcinol-formaldehyde resin | 5.0 |
| Vinyl pyridine-butadiene-styrene terpolymer | 30.0 |
| Dicarboxylated butadiene-styrene resin | 20.0 |
| Microcrystalline paraffin wax | 6.0 |
| Modified chromic complex | 5.0 |
| Water to solids content of 28% | |

EXAMPLE 9

Using the procedure described in Example 1, the trimethylol resorcinolato chromic complex prepared in Example 2 of copending application Ser. No. 98,813 is reacted with triethanol amine. The resulting complex is then formulated into the impregnating composition of Example 1.

EXAMPLE 10

Using the procedure described in Example 1, 30 percent by weight stearato chromic chloride in isopropanol is reacted with triethanol amine in a mole ratio of 1.5:1. The modified complex is then formulated into the following impregnating composition:

| | Parts by weight (solids) |
|---|---|
| Resorcinol-formaldehyde resin | 5.0 |
| Vinyl pyridine-butadiene-styrene rubber | 30.0 |
| Modified chromic complex | 2.0 |
| Water to solids content | |

In the preceding examples, the modified chromic complexes, which are in the form of viscous liquids, are compatible with the alkaline impregnant systems, and the complexes have no tendency to cause precipitation or coagulation of the latex components of the impregnating compositions. The impregnated bundles can be used as reinforcement for elastomeric materials whereby the impregnant containing the modified chromic complexes serves to securely anchor the impregnated bundle to the elastomeric material.

As used herein, the term "elastomer" is intended to mean and include natural rubber in the cured or uncured stage, vulcanized or unvulcanized stage, and synthetic organic elastomeric materials such as nitriles, acrylics and esters and terpolymers thereof with styrene and acrylonitriles, styrene and vinyl pyridine; and EPDM rubbers as represented by butadiene polymers and copolymers with monoolefins, such as butadiene-styrene vinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monoolefin having from three to 20 carbon atoms, such as propylene, and polyene, such as dicyclopentadiene, 1,4-hexadiene and preferably an alkylene or alkylidene norbornene, such as 5-alkylidene-2-norbornene and the like in which the alkylidene group numbers from two to 12 carbon atoms, and polysulfone rubbers.

The compositions described in Examples 1 to 10 can also be used in the treatment of individual glass fibers to form a thin coating of the blend of the resorcinol-aldehyde resin component, the elastomer component and the modified chromic complex to afford the individual fibers even greater protection from destruction through mutual abrasion for use in the reinforcement of elastomeric materials.

The term "glass fibers", as used herein, is intended to refer to and include (1) continuous fibers formed by rapid attenuation of hundreds of streams of molten glass and to strands formed when such continuous glass fiber filaments are gathered together as they are being formed; and to yarns and cords formed by plying and/or twisting a number of strands together, and to woven and non-woven fabrics which are formed of such glass fiber strands, yarns or cords, and (2) discontinuous fibers formed by high pressure steam, air or other suitable attenuating force directed onto multiple streams of molten glass issuing from a glass melting bushing or from an orifice containing spinner, and to yarns that are formed when such discontinuous fibers are gathered together to form a sliver which is drafted into a yarn; and to woven and non-woven fabrics formed of such yarns of discontinuous fibers, and (3) combinations of such continuous and discontinuous fibers in strands, yarns, cords and fabrics formed thereof.

It has been found that the modified complexes of the present invention can be used alone in the treatment of glass fibers to improve the bonding relationship between the glass fibers and elastomeric materials. This concept may be illustrated by way of the following examples.

EXAMPLE 11

An aqueous solution of the modified chromic complex prepared in Example 1 is applied to individual glass fibers to form a thin film or size coating on the individual fibers.

The coated fibers can be directly combined with elastomeric materials in the manufacture of glass fiber reinforced elastomeric products, or the coated glass fibers can be formed into bundles and the bundles impregnated with an impregnating composition of the type illustrated in Examples 1 to 10 which may or may not be formulated to include a modified chromic complex of the invention for use as reinforcement for elastomeric materials.

EXAMPLE 12

The procedure of Example 11 is repeated using the modified chromic complex prepared in Example 3.

In facilitating the combination of glass fibers treated in accordance with the present invention with elastomeric materials, the individual glass fibers containing a coating on the surfaces thereof from Examples 11 and 12 or bundles of glass fibers impregnated with one of the compositions of Examples 1 to 10 are mixed with elastomeric material or otherwise laid down in the desired arrangement for combination with the elastomeric material, as in the manufacture of glass fiber reinforced belts or in the manufacture of rubber tires reinforced with cords of glass fibers. The combination of glass fibers and elastomeric material is processed in a conventional manner by mold or cure under heat and compression or vulcanized for advancement of the elastomeric material to a cured or vulcanized stage while in combination with the treated glass fibers or bundles of glass fibers whereby the glass fibers or bundles of glass fibers become strongly integrated with the elastomeric materials in the glass fiber-elastomeric product.

In the final system, the elastomeric material with which the glass fibers or bundles of glass fibers are combined, constitutes a continuous phase. Such continuous phase elastomeric materials may comprise elastomers or rubbers of the type incorporated into the treating compositions or the elastomeric material can differ therefrom. It is believed that the tie-in between the individually coated glass fibers or the impregnated bundles of glass fibers and the elastomeric materials forming the continuous phase occurs primarily during cure or vulcanization of the elastomeric material in combination with the treated glass fibers.

It will be apparent that various changes and modifications can be made in the details of procedure, formulation and use without departing from the spirit of the invention, especially as defined in the following claims.

I claim:

1. Glass fibers having a coating thereon, said coating comprising 99.9 to 80 percent by weight of a blend of a resorcinol-aldehyde resin and an elastomer and 0.1 to 20 percent by weight of a chromic complex prepared by contacting a chromic complex selected from the group consisting of (1) the reaction product of chromyl chloride with a compound selected from the group consisting of resorcinol and a polymethylol-substituted resorcinol and (2) a Werner complex with an amine compound selected from the group consisting of an alkanol amine and an alkylene amine.

2. Glass fibers as defined in claim 1 wherein the coating is a coating on the individual glass fiber surfaces.

3. Glass fibers as defined in claim 1 wherein the glass fibers are in the form of a bundle and the coating constitutes an impregnant in the bundle.

4. Glass fibers as defined in claim 1 wherein the complex is a complex of the formula

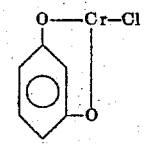

5. Glass fibers as defined in claim 1 wherein the complex is a complex of the formula

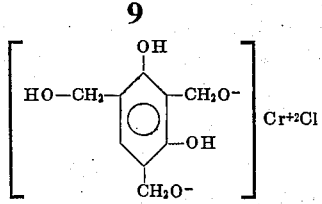

6. Glass fibers as defined in claim 1 wherein the complex is a Werner complex in which the carboxylato group coordinated with the trivalent chromium atom contains two to 20 carbon atoms.

7. Glass fibers as defined in claim 6 wherein the carboxylato group is substituted by a group selected from the group consisting of an amino group, an epoxy group, a mercapto group and a hydroxy group.

8. Glass fibers as defined in claim 3 wherein the glass fibers forming the bundle have a thin size coating on the individual surfaces thereof.

9. Glass fibers as defined in claim 3 wherein the bundle is a cord formed of strands of glass fibers which have been plied and twisted together.

10. Glass fibers having a thin coating thereon, said coating comprising a complex prepared by reacting a chromic complex selected from the group consisting of (1) the reaction product of chromyl chloride with a compound selected from the group consisting of resorcinol and a polymethylol-substituted resorcinol and (2) a Werner complex with an amine compound selected from the group consisting of an alkanol amine and an alkylene amine.

11. Glass fibers as defined in claim 10 wherein the complex is a complex of the formula

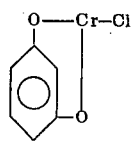

12. Glass fibers as defined in claim 10 wherein the complex is a complex of the formula

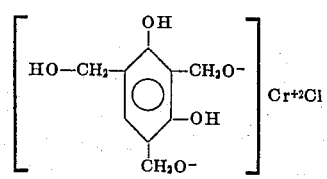

13. Glass fibers as defined in claim 10 wherein the complex is a Werner complex in which the carboxylato group coordinated with the trivalent chromium atom contains 2 to 20 carbon atoms.

14. Glass fibers as defined in claim 13 wherein the carboxylato group is substituted by a group selected from the group consisting of an amino group, an epoxy group, a mercapto group and a hydroxy group.

15. Glass fibers as defined in claim 10 wherein the glass fibers are in the form of a bundle, and the bundle includes an impregnant therein comprising an elastomer compatible material.

16. Glass fibers as defined in claim 15 wherein the elastomer compatible material is a blend of a resorcinol-aldehyde resin and an elastomer.

17. In a glass fiber-reinforced elastomeric product wherein an elastomeric material constitutes a continuous phase in which the glass fibers are distributed, the improvement in the bonding relationship between the glass fibers and the elastomeric material comprising a coating on the glass fibers containing a complex prepared by reacting a chromic complex selected from the group consisting of (1) the reaction product of chromyl chloride with a compound selected from the group consisting of resorcinol and a polymethylol-substituted resorcinol and (2) a Werner complex with an amine compound selected from the group consisting of an alkanol amine and an alkylene amine.

18. A product as defined in claim 17 wherein the coating also contains a blend of a resorcinol-aldehyde resin and an elastomer.

19. A product as defined in claim 18 wherein the glass fibers are in the form of a bundle and the coating is an impregnant in the bundle.

20. A product as defined in claim 19 wherein the glass fibers forming the bundle have a thin size coating on the individual surfaces thereof.

21. A product as defined in claim 17 wherein the glass fibers are in the form of a bundle, with the coating being a thin film on the individual glass fibers, and the bundle includes an impregnant comprising a blend of a resorcinol-aldehyde resin and an elastomer in the bundle.

* * * * *